US010478739B1

(12) United States Patent
Mathis

(10) Patent No.: US 10,478,739 B1
(45) Date of Patent: Nov. 19, 2019

(54) MODEL AIRPLANE ENGINE STARTING STICK

(71) Applicant: Richard M Mathis, St. George, UT (US)

(72) Inventor: Richard M Mathis, St. George, UT (US)

( * ) Notice: Subject to any disclaimer, the term of this patent is extended or adjusted under 35 U.S.C. 154(b) by 613 days.

(21) Appl. No.: 15/362,480

(22) Filed: Nov. 28, 2016

(51) Int. Cl.

| | |
|---|---|
| ***A63H 27/14*** | (2006.01) |
| ***F02B 75/34*** | (2006.01) |
| ***F02N 3/00*** | (2006.01) |
| ***B64F 1/34*** | (2006.01) |
| ***A63H 27/00*** | (2006.01) |
| ***F02N 1/00*** | (2006.01) |
| *F02N 15/10* | (2006.01) |

(52) U.S. Cl.
CPC ............. *A63H 27/14* (2013.01); *A63H 27/02* (2013.01); *B64F 1/34* (2013.01); *F02B 75/34* (2013.01); *F02N 1/005* (2013.01); *F02N 3/00* (2013.01); *F02N 15/10* (2013.01)

(58) Field of Classification Search
CPC ......... A63H 27/02; A63H 27/14; F02B 75/34; F02N 1/005; F02N 1/02; F02N 3/00; F02N 15/10
USPC ....................................................... 123/185.7
See application file for complete search history.

(56) References Cited

U.S. PATENT DOCUMENTS

| | | | | |
|---|---|---|---|---|
| 2,284,887 A * | 6/1942 | Vollenweider | F02B 75/34 74/133 |
| 2,448,844 A | 9/1948 | Throsel | |
| 2,622,701 A | 12/1952 | Kellogg et al. | |
| 2,727,590 A | 12/1955 | Mattox | |
| 2,751,898 A * | 6/1956 | De Groat | F02B 75/34 123/179.27 |
| 2,875,554 A | 3/1959 | Boultinghouse | |
| 3,094,109 A | 6/1963 | Effinger, Jr. | |
| 4,296,898 A | 10/1981 | Watson | |
| 4,331,110 A | 5/1982 | Robinet | |
| 4,440,122 A | 4/1984 | Theobald | |
| 4,651,688 A | 3/1987 | Selzer et al. | |
| 5,052,653 A | 10/1991 | Coraccio | |
| 5,535,713 A | 7/1996 | Braddock | |
| 6,655,336 B2 | 12/2003 | Arlton | |
| 6,968,821 B2 * | 11/2005 | Otsuki | F02B 75/34 123/185.2 |

(Continued)

OTHER PUBLICATIONS

Sullivan, "Starter Adapters and Attachments", https://www.sullivanproducts.com/StarterAccessoriesContent.htm, p. 5. Accessed on Nov. 30, 2016.

(Continued)

*Primary Examiner* — Erick R Solis
(74) *Attorney, Agent, or Firm* — Thorpe North and Western, LLP

(57) ABSTRACT

A model airplane engine starting stick is provided with a blade edge engaging roller having a roller surface of a material which will grip the blade edge of the propeller when against the blade edge of the propeller to cause the roller to roll along the blade edge without sliding over and damaging the blade edge as the starting stick is moved with respect to the blade edge to rotate the propeller. The starting stick of the invention includes a handle by which the starting stick can be held and manipulated by a user and a roller attached to the handle to freely rotate or roll with respect to the handle.

17 Claims, 3 Drawing Sheets

(56) References Cited

U.S. PATENT DOCUMENTS

| | | | | |
|---|---|---|---|---|
| 7,305,956 | B2 | 12/2007 | Thomas et al. | |
| 9,587,615 | B2 * | 3/2017 | Koehler | F02N 15/022 |

OTHER PUBLICATIONS

Hobbico, “Safety Stick”, http://www.hobbico.com/shop/fieldequip/heap3335.php. Accessed on Nov. 30, 2016.

* cited by examiner

MODEL AIRPLANE ENGINE STARTING STICK

BACKGROUND

Field of the Invention

The invention is in the field of model airplane engines and particularly to devices for starting model airplane engines.

State of the Art

Flying radio controlled model airplanes is a worldwide hobby. These model airplanes are generally powered by internal combustion engines which turn propellers. Some models can have up to thirty six inch diameter propellers with some large powerful engines having as high as 800 cc. To avoid additional weight, these engines generally do not include starters. To start the engine, the propeller must be rotated. This is generally done by hand, with the person starting the engine placing their hand on a propeller blade near an end of the blade to hold the blade and then moving the arm and hand in a manner to rotate the propeller. However, this is a very dangerous thing to do. When the engine starts, the person starting the engine must quickly move his or her hand out of the path of the rotating propeller blade so as not to be hit by the rotating propeller blade when the engine starts. If the hand is not moved out of the way in time when the engine is started, the propeller blade will hit fingers or the hand and can cause serious injury, such as broken bones. Some people use a glove, but the only thing a glove does is keep all the broken bones together in the glove if the hand is hit by the rotating propeller blade. This is a problem with serious consequences.

People have tried using sticks wherein the person holds an end of the stick out of the path of the propeller blades and places the other end of the stick against the propeller blade edge and moves the stick against the edge of the propeller blade to rotate the propeller. Some people use a simple straight stick and drag the stick along the edge of the propeller blade to rotate the blade. This works but is not a good thing to start the engine with. The reason is because if a stick is dragged along the propeller blade edge, it will damage the sharp edge of the propeller blade throwing the propeller out of balance. It is difficult to use a stick to rotate the propeller blade without the stick scraping along the blade edge to some extent. To provide a soft surface against the propeller blade, some people use a paint roller as a starting stick holding one end of the paint roller in their hand and positioning the opposite end of the paint roller against the propeller blade edge. This also works but is not a good thing to start the engine with. If a paint roller is used and the propeller blade has small imperfections on the edge of the blade, the edge of the blade will tear off pieces of fiber from the paint roller and again damage the propeller. As with the straight stick, it is difficult to hold and use a paint roller as a stick to rotate the propeller blade without the paint roller dragging along the blade edge to some extent. With the cost of a carbon fiber propeller for a large size radio controlled airplane easily being $250 and up, people want to avoid damaging a propeller. This is the reason people don't use a stick and take the chance of injury by starting the engine with their hands.

There are two commercially available engine starting sticks, generally referred to by model airplane enthusiasts as "chicken sticks". These are the "Chicken Stick" sold by Sullivan Products, Baltimore, Md., and the "Safety Stick Engine Starter" sold by Hobbico, Inc., Champaign, Ill. Both of these sticks are similar to a straight stick, and are rigid sticks formed with a handle portion by which the stick is held by the user and a propeller contacting portion which contacts and grips the edge of the propeller blade so that the user can move the stick in the same manner that the user would move his or her arm and hand in rotating the propeller to start the engine. The propeller contacting portion is designed to grip the edge of the propeller blade and resist sliding along the edge of the propeller blade so to not damage the sharp edge of the propeller blade thereby not throwing the propeller out of balance. However, even with these sticks, it is difficult to hold and use such sticks to rotate the propeller blade without the stick dragging along the blade edge to some extent.

Recognizing the problem of potential serious injury resulting from starting airplane engines by hand, and the problems of using a stick to start the engine, people have developed other devices to use in starting airplane engines. One class of model airplane engine starters use a starter spring attached to the engine. The propeller is coupled to the starter spring and is manually rotated by the user in the direction opposite to the starting direction to twist and wind up the spring. The propeller is then released by the user who quickly moves his or her hand out of the path of the propeller and the spring rotates the propeller in the starting direction to start the engine. However, this type of starter has to be included as part of the model engine or propeller structure, and is not generally included. A second class of model airplane engine starters provide a separate starter apparatus which includes an electric motor which engages the front or hub of the propeller shaft and rotates the propeller shaft to start the engine. However, this requires the separate starter apparatus and a battery and many model airplane enthusiasts do not like to use such starters.

SUMMARY OF THE INVENTION

According to the invention, a model airplane engine starting stick can be provided with a blade edge engaging roller having a roller surface of a material which will grip the blade edge of the propeller when against the blade edge of the propeller to cause the roller to roll along the blade edge without sliding over and damaging the blade edge as the starting stick is moved with respect to the blade edge and which is strong enough to not tear and leave pieces of the roller along the blade edge which might unbalance the blade or otherwise damage the blade edge. The starting stick of the invention includes a handgrip by which the starting stick can be held and manipulated by a user. A roller is mounted to the handle to freely rotate with respect to the handle and to be positioned against a blade edge of a propeller blade of the propeller of the engine to be started. The roller surface is of a material which will grip the blade edge and resist sliding along the blade edge so that any movement of the starting stick with respect to the blade edge will cause rotation of the roller along the blade edge rather than sliding of the roller along the blade edge which could cause damage to the blade edge. Rolling motion along the blade edge will not damage the blade edge and the surface material of the roller will not be pulled from the roller and stick to the blade edge. With the starting stick of the invention, a user can manipulate the starting stick to travel along the blade edge for the length of the blade edge during starting of the engine or can attempt to limit the travel of the starting stick along the blade edge but be comfortable in knowing that any travel along the blade edge that may occur will not damage the blade edge.

In one embodiment of the invention, the starting stick includes an elongate shaft, such as formed from a length of rigid PVC pipe, with a handle grip, such as formed by a silicone material, secured along an end portion of the elongate shaft by which the starting stick can be easily held and manipulated by a user. A roller base, such as formed from a shorter length of rigid PVC pipe, is positioned over the opposite end portion of the PVC pipe shaft so that the roller base will roll with respect to the shaft. A length of vinyl tubing is positioned over the roller base to form the roller surface. The roller surface formed by the outer surface of the vinyl tubing is softer than material forming the propeller blade, now usually a carbon fiber material, so the edge of the propeller blade will cut into the vinyl plastic tubing before the vinyl surface can damage the propeller blade. In addition, the softer vinyl roller surface will cause the roller to roll along the sharp blade edge rather than dragging or scraping along the blade edge and therefore will not damage the propeller blade edge.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF THE ILLUSTRATED EXAMPLE EMBODIMENT

Figure 1:
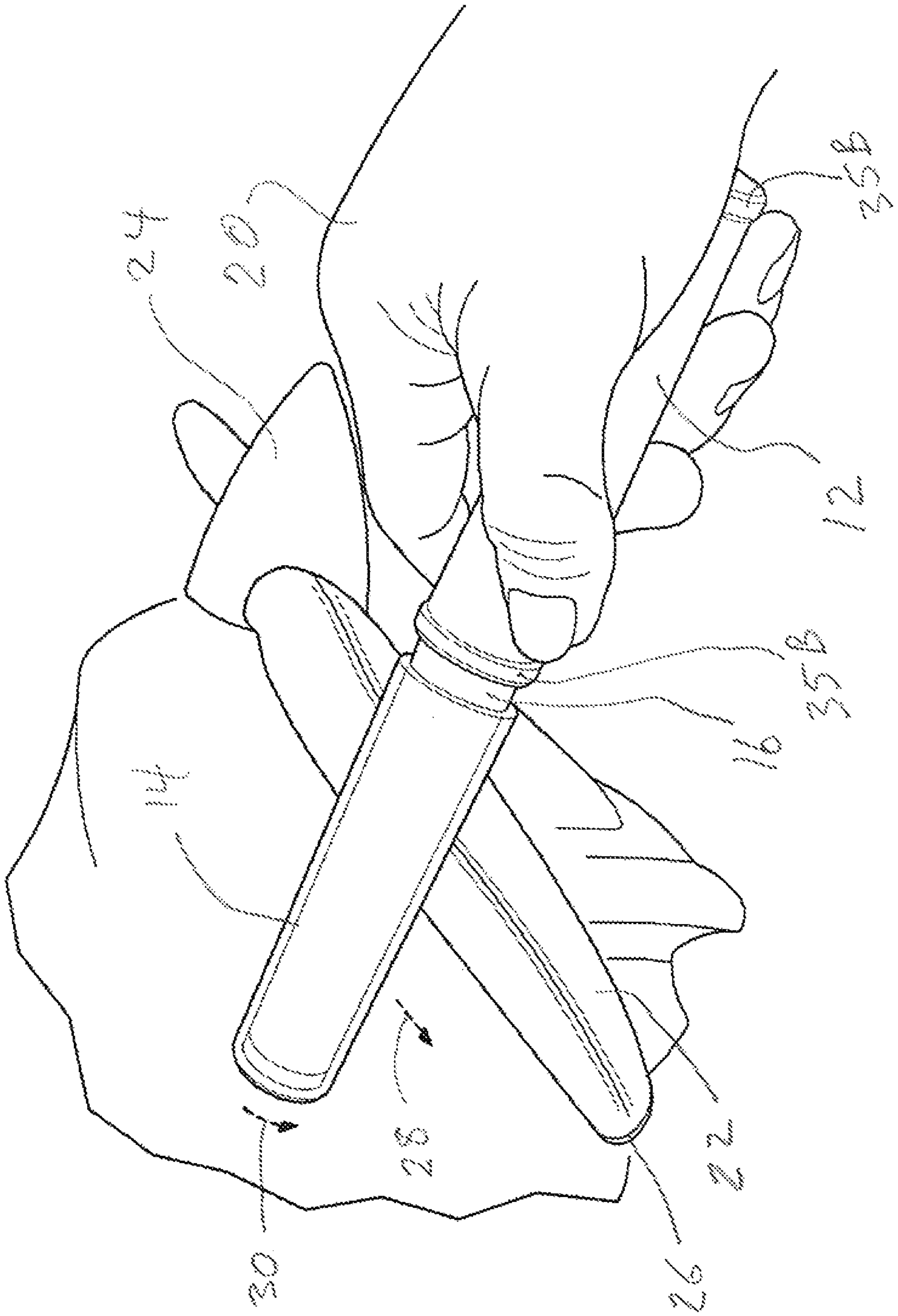
FIG. 1 is a pictorial view of the nose of a radio controlled model airplane with a propeller having propeller blades extending from a propeller hub and showing the engine starting stick of the invention held by the hand of a user and in position against the edge of a propeller blade to move the engine starting stick against the edge of the propeller blade to start the engine to which the propeller blade is coupled.

The model airplane starting stick of the invention, shown generally as 10, provides an effective and relatively safe way of starting a model aircraft engine. The illustrated starting stick as shown in FIG. 1 includes a handgrip 12 and a roller 14. Roller 14 is free to roll with respect to handle 12. A ring 16 spaces the handle 12 from roller 14 to prevent contact of a rolling roller 14 against handle 12 which could damage adjacent ends of either handle 12 or roller 14. In use of the starting stick, as shown in FIG. 1, the handle 12 of the starting stick is held by the hand 20 of a user and the roller 14 is placed against the edge of a model airplane propeller blade 22. The stick is then manipulated by the user to rotate the propeller which rotation starts the engine to which the propeller is attached in normal manner, as with traditional hand rotation of the propeller. The user can manipulate the propeller in a desired manner such as by placing the roller 14 of the starting stick against the edge of the propeller blade 22 inwardly toward the propeller hub 24 about half way the length of the propeller blade, such as shown in FIG. 1, and moving the starting stick primarily downwardly causing the roller 14 to roll along the edge of the propeller blade 22 toward and off the outer end 26 of the propeller blade 22 as shown by arrow 28, realizing that arrow 28 will move to more downward directions as the propeller 22 rotates, with such movement along the edge of propeller 22 causing the roller 14 to rotate as shown by arrow 30. The surface of roller 14 in contact with the edge of blade 22 is of a relatively soft and griping material, such as vinyl, that will resist any slipping or dragging along the edge of propeller blade 22 so that roller 14 is forced to rotate as it moves along the edge of propeller blade 22. This rolling of roller 14 along the edge of propeller blade 22 prevents the starting stick from damaging the edge of propeller blade 20 in any way. Similarly, if the user prefers to place the roller 14 against the edge of propeller blade 22 farther out along the propeller blade toward the end 26 of the propeller 22 and to move the starting stick in a manner as the user would move his or her hands if rotating the propeller by hand, thereby minimizing movement of the starting stick along the edge of the propeller blade 22, the roller 14 will still roll if any movement along the edge of blade 22 occurs so as to prevent damage to the blade edge. This rolling of the end of the starting stick against the edge of the propeller blade is the important feature of the invention which prevents damage to the edge of the propeller blade during starting of the engine. It will also be noted that by using the starting stick, the user's hand 20 remains away from the path of the rotating propeller so is not in danger of being hit by the propeller when the engine starts.

Figure 3:
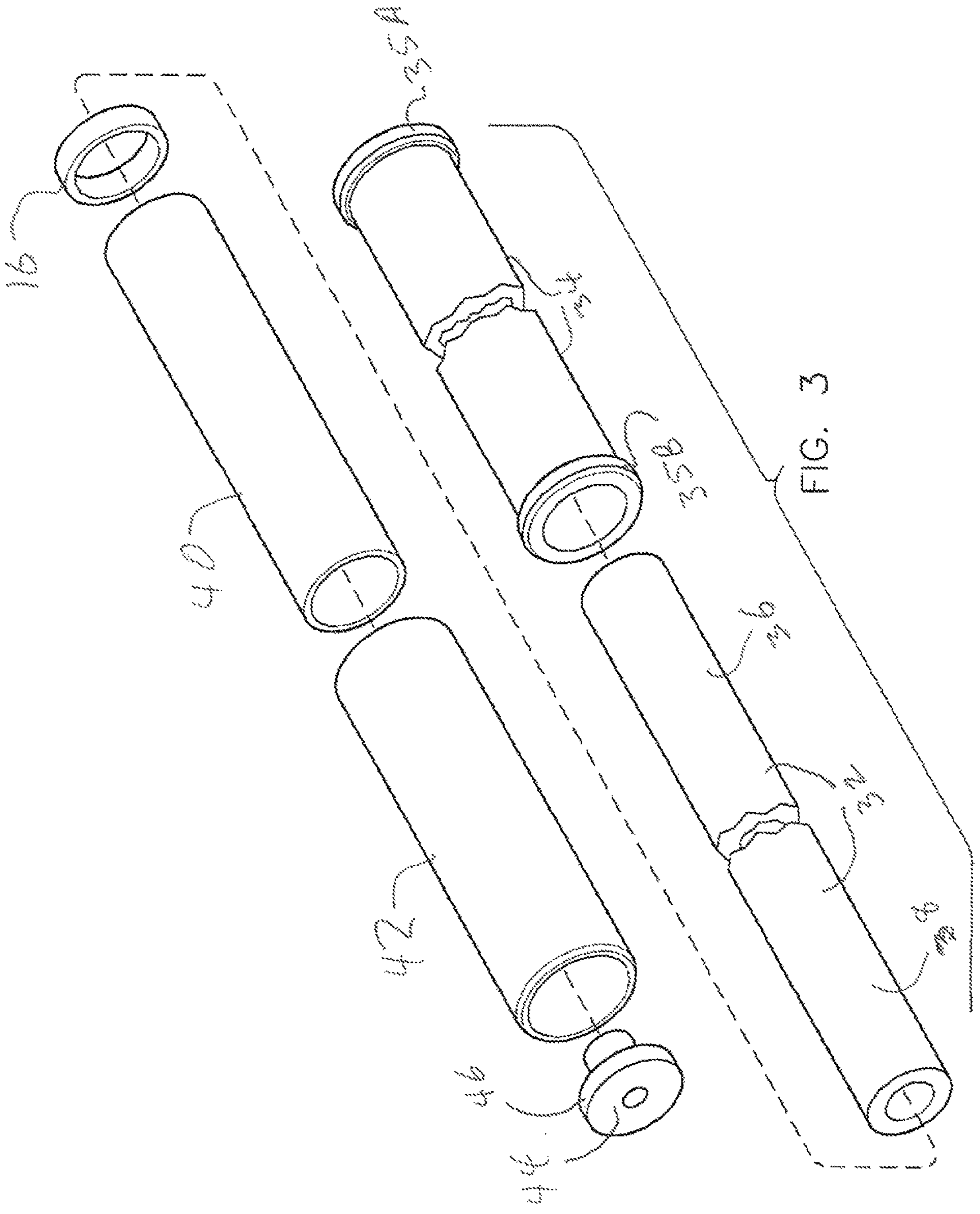
FIG. 3 is a pictorial assembly view of the starting stick of FIGS. 1 and 2 showing the parts of the illustrated model airplane starting stick.

The Figures illustrate a particular example embodiment of the construction of the starting stick of the invention. However, the invention is not limited to the construction of the illustrated embodiment. As shown in detail in FIGS. 3 and 4 a starting stick of the invention may include a handle having an elongate shaft 32 with handgrip 34 secured to a handgrip portion 36 of shaft 32. Shaft 32 also has a roller attachment portion 38. The shaft 32 can be a piece of rigid and strong PVC pipe, with 7/8" diameter PVC pipe with 3/16" wall thickness having been found satisfactory. This PVC pipe forming the shaft has been found to be strong enough to overcome the engine compression cycle and, in the event of an engine kick-back, strong enough to withstand the impact of the propeller hitting the stick without breaking. The handgrip 34 can be formed of a silicone material which is secured to the handgrip portion 36 of shaft 32. A handgrip of 1/8" thick silicone not only serves as a non-slip holding surface for a user to hold, but is epoxied onto the shaft with aircraft grade epoxy which in combination with the PVC pipe make the stick extremely strong. Handgrip 34 may be variously shaped to provide a good griping surface and shape for a user. In the embodiment shown, a back end flange 35A and a forward flange 35B are shown. These flanges position the user's hand on the handgrip 34.

A roller base 40 is rotatably secured to the roller attachment portion of the shaft 32. The roller base 40 may take the form of a length of 1 1/16" diameter PVC pipe with a 1/16" wall thickness. This roller base 40 has a slightly larger inside diameter then the outside diameter of the shaft so forms a sleeve which fits over the roller attachment portion of the shaft 32 in a manner so that it freely rotates or rolls on shaft 32. The combination of the described PVC pipes make a virtually unbreakable stick when used for the purpose of starting model airplane engines. Further, making both the shaft 32 and the roller base 40 of the same PVC material reduces the friction and allows the roller base 40 to easily roll on the shaft 32.

The desired roller surface is provided by securing a sleeve 42, such as a length of tubing of appropriate material, around the roller base 40. A length of clear vinyl tubing which is 1¼" in diameter and ⅛" thick has been found satisfactory for forming the roller surface. The clear vinyl tubing is very strong yet will cut before damaging the blade of the propeller. This is an important property of the clear vinyl tubing. The clear vinyl tubing also has a gripping property which is needed to grip the propeller and thereby force the rolling of the clear vinyl tubing and roller rather than allowing the roller to sliding over the edge of the blade which could damage the propeller blade.

Spacer 16, in the form of a PVC ring, serves two purposes: First, it keeps the rolling roller base from wearing the forward portion of the grip. The rolling action of the edge of the roller base against the silicone grip would very quickly damage the end of the silicone grip. Second, the spacer ring is made out of the same PVC material as the roller base and this is where the end of the roller base rubs against when rolling. Since they are both made of the same hard, smooth material the roller rolls with little friction or resistance.

Figure 2:
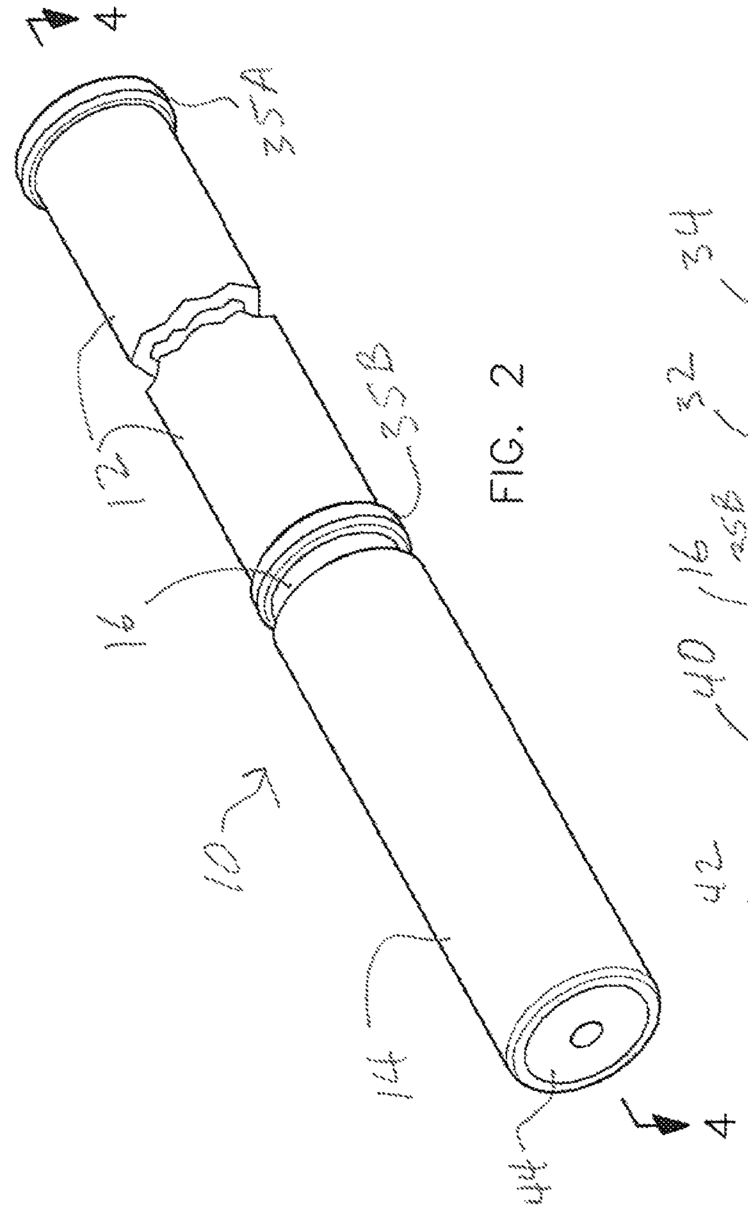
FIG. 2 is a pictorial view of the model airplane starting stick of FIG. 1 with a portion of the starting stick cut out to decrease the length of the drawing.
Figure 4:
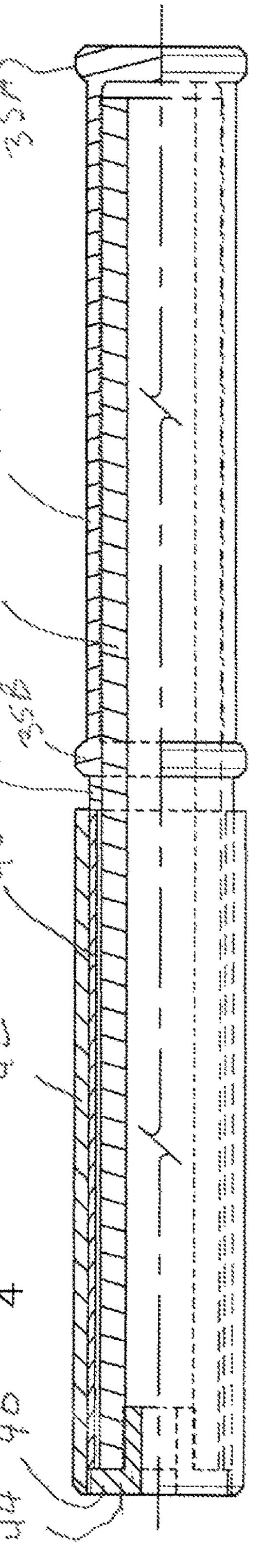
FIG. 4 is a fragmentary horizontal section of the starting stick taken on the line 4-4 of FIG. 2 showing a quarter of the starting stick in section and a quarter of the starting stick in top plan view.

A 'T' plug 44 is epoxied into the end of shaft 36. The high shoulder 46 of the plug 44 keeps the roller base 40 in place, stopping it from coming off the end of the shaft 32. The outer diameter of shoulder 46 of T plug 44 has to be slightly larger than the inside diameter of roller base 40, yet less than the inside diameter of clear vinyl tubing 42, so it does not extend above clear vinyl tubing 42 and restrict the rolling of the roller 40 and clear vinyl tubing 42. As shown in FIGS. 2 and 4, the clear vinyl tubing 42 extends over the high shoulder 46 of T plug 44 so that in the event the user of the stick rolls the stick off the side of the propeller before getting to the end of the prop, the clear vinyl tubing will protect the blade from hitting the shoulder 46 of 'T' plug 44 and possibly chipping or otherwise damaging the thin sharp edge of the blade. In normal use of the starting stick of the invention, the starting stick is meant to be rolled over the propeller blade all the way to the end of the propeller and off the tip of the propeller. However, in some situations, a user may run the end of the starting stick across the edge of the blade and off the blade before reaching the end of the blade.

While the invention has been described in detail with reference to a specific example embodiment of the invention, various constructions of the airplane starting stick can be used to provide a starting stick having a handle whereby the user can hold and manipulate the starting stick for rotating a model airplane propeller for starting the engine powering the propeller, and providing a freely rotatable or rolling portion of the starting stick for contacting the propeller blade edge so that the stick is not dragged or scraped over the propeller blade edge during starting, which dragging or scraping can damage the propeller blade edge.

While the forgoing example is illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A model airplane engine starting stick for manually rotating a propeller attached to the model airplane engine, the propeller having propeller blades extending outwardly from a propeller hub and with the blades having blade edges, comprising:

a handle having a handgrip by which the starting stick can be held and manipulated;

a roller mounted to the handle to freely rotate with respect to the handle and to be positioned against a blade edge of the propeller when the propeller is stationary before the model airplane engine is started; and a roller surface of a material which will grip the blade edge of the propeller when against the blade edge of the propeller and will cause the roller to roll along the blade edge without sliding over the blade edge as the starting stick is moved with respect to the blade edge;

whereby the starting stick can be held and manipulated by a user with the roller against the blade edge to rotate the propeller and start the model aircraft engine without damaging the blade edge.

2. A model airplane engine starting stick according to claim 1, wherein the handle includes an elongate shaft having a handgrip portion and a roller attachment portion, the roller being attached to the roller attachment portion of the shaft.

3. A model airplane engine starting stick according to claim 2, wherein the handgrip is handgrip material secured to the handgrip portion of the shaft.

4. A model airplane engine starting stick according to claim 3, wherein the handgrip material is a silicone material.

5. A model airplane engine starting stick according to claim 3, wherein the roller is rotatably mounted to the roller attachment portion of the shaft.

6. A model airplane engine starting stick according to claim 5, wherein the roller is a sleeve rotatably mounted on the roller attachment portion of the shaft.

7. A model airplane engine starting stick according to claim 6, wherein the roller includes a roller base formed from a roller length of rigid pipe slidably mounted on the roller attachment portion of the shaft, and roller surface material coating the outside surface of the roller base.

8. A model airplane engine starting stick according to claim 7, wherein the roller length of rigid pipe forming the roller base has an inside diameter, and wherein the roller mounting portion of the shaft is cylindrical and has an outside diameter approximating but less than the inside diameter of the roller length of rigid pipe forming the roller base.

9. A model airplane engine starting stick according to claim 8, wherein the roller length of rigid pipe is a length of rigid PVC pipe.

10. A model airplane engine starting stick according to claim 9, wherein the roller surface is formed by a sleeve of roller surface material placed around the roller base.

11. A model airplane engine starting stick according to claim 10, wherein the sleeve forming the roller surface material placed around the roller base is a length of vinyl tubing.

12. A model airplane engine starting stick according to claim 11, wherein the roller base has an end toward the hand grip and an end away from the hand grip, and wherein the length of vinyl tubing forming the roller surface extends beyond the end of the roller base away from the hand grip.

13. A model airplane engine starting stick according to claim 12, wherein the shaft is a length of rigid PVC pipe.

14. A model airplane engine starting stick according to claim 12, additionally including a spacer between the hand grip and the roller.

15. A model airplane engine starting stick according to claim 7, wherein the roller surface is formed by a sleeve of roller surface material placed around the roller base.

16. A model airplane engine starting stick according to claim 15, wherein the sleeve forming the roller surface material placed around the roller base is a length of vinyl tubing.

17. A model airplane engine starting stick according to claim 16, additionally including a flange on the end of the shaft for holding the roller base on the shaft and wherein the vinyl tubing extends over the flange.

* * * * *